(12) United States Patent
Suzuki (10) Patent No.: US 11,936,825 B2
(45) Date of Patent: Mar. 19, 2024

(54) IMAGE FORMING APPARATUS USING AN ADJUSTMENT PATTERN FORMED ON ONE SIDE OF A MEDIUM TO CORRECT IMAGE FORMATION ON THE OPPOSITE SIDE OF THE MEDIUM

(71) Applicant: Hideaki Suzuki, Kanagawa (JP)

(72) Inventor: Hideaki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/101,199

(22) Filed: Jan. 25, 2023

(65) Prior Publication Data

US 2023/0262178 A1 Aug. 17, 2023

(30) Foreign Application Priority Data

Feb. 17, 2022 (JP) ................................ 2022-022855

(51) Int. Cl.
*H04N 1/00* (2006.01)
*H04N 1/19* (2006.01)
(52) U.S. Cl.
CPC ....... *H04N 1/00588* (2013.01); *H04N 1/1903* (2013.01); *H04N 2201/3242* (2013.01)
(58) Field of Classification Search
CPC .......... H04N 1/00045; H04N 1/00588; H04N 1/1903; H04N 2201/3242

USPC .................................................. 358/406, 504
See application file for complete search history.

(56) References Cited

U.S. PATENT DOCUMENTS

| | | | | |
|---|---|---|---|---|
| 2008/0019724 | A1* | 1/2008 | Yamagata | G03G 15/0131 399/72 |
| 2019/0369518 | A1* | 12/2019 | Murakami | G03G 15/5058 |
| 2021/0063909 | A1* | 3/2021 | Maeda | G02B 26/127 |

FOREIGN PATENT DOCUMENTS

JP 2021-149094 9/2021

\* cited by examiner

*Primary Examiner* — Kent Yip
(74) *Attorney, Agent, or Firm* — Duft & Bornsen, PC (57) ABSTRACT

An image forming apparatus includes a conveyor, an image former, and a reading device. The conveyor conveys a medium in a conveyance direction. The image former forms an adjustment pattern on one side of the medium conveyed by the conveyor. The reading device downstream from the image former in the conveyance direction reads the adjustment pattern on the one side of the medium conveyed by the conveyor to generate read data. The adjustment pattern includes a first line segment and a second line segment that extend in directions different from each other and each are inclined with respect to the conveyance direction.

4 Claims, 7 Drawing Sheets

IMAGE FORMING APPARATUS USING AN ADJUSTMENT PATTERN FORMED ON ONE SIDE OF A MEDIUM TO CORRECT IMAGE FORMATION ON THE OPPOSITE SIDE OF THE MEDIUM

CROSS-REFERENCE TO RELATED APPLICATIONS

This patent application is based on and claims priority pursuant to 35 U.S.C. § 119(a) to Japanese Patent Application No. 2022-022855, filed on Feb. 17, 2022, in the Japan Patent Office, the entire disclosure of which is hereby incorporated by reference herein.

BACKGROUND

Technical Field

Embodiments of the present disclosure relate to an image forming apparatus.

RELATED ART

An image forming apparatus is known that forms images on the front side and the back side of a sheet-shaped medium.

In such an image forming apparatus, the medium may deform as an image formed on the front side of the medium dries. When an image is formed on the back side of the medium having been deformed, the position and the size of the image may shift between the front side and the back side of the medium.

For this reason, among image forming apparatuses that have a configuration as described above, an image forming apparatus is known that have a function of causing a reading device to read adjustment patterns formed on the front side of a medium and correcting an image to be formed on the back side of the medium based on the difference between an ideal position and an actual position of each of the adjustment patterns.

Such an adjustment pattern typically includes a first line segment extending in a conveyance direction of the medium and a second line segment orthogonal to the conveyance direction as in, for example, a cross shape, an L shape, or a T shape.

SUMMARY

In an embodiment of the present disclosure, an image forming apparatus includes a conveyor, an image former, and a reading device. The conveyor conveys a medium in a conveyance direction. The image former forms an adjustment pattern on one side of the medium conveyed by the conveyor. The reading device downstream from the image former in the conveyance direction reads the adjustment pattern on the one side of the medium conveyed by the conveyor to generate read data. The adjustment pattern includes a first line segment and a second line segment that extend in directions different from each other and each are inclined with respect to the conveyance direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of an image forming apparatus according to an embodiment of the present disclosure below.

Figure 1:
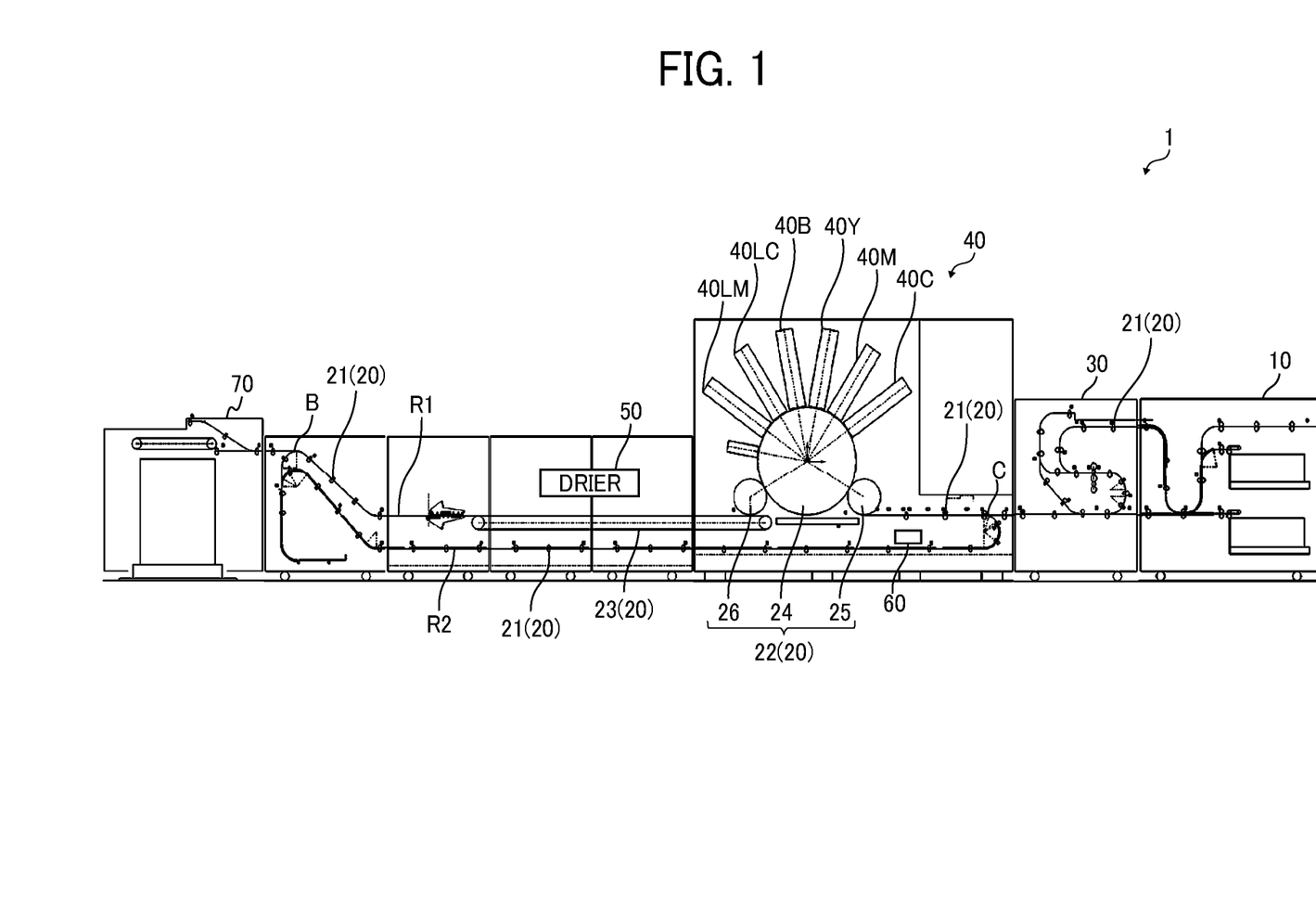
FIG. 1 is a diagram illustrating an overall configuration of an image forming apparatus according to an embodiment of the present disclosure.

FIG. 1 is a diagram illustrating an overall configuration of an image forming apparatus 1 according to the present embodiment.

The image forming apparatus 1 has a function of forming an image on the front side, which is a first face, and on the back side, which is a second face, of a medium M, separately.

Note that the medium M may be any material as long as the material is a sheet-shaped material such as paper or cloth on which an image can be formed on the front side and the back side of the material and expands and contracts when a substance such as ink or toner that forms the image dries.

As illustrated in FIG. 1, the image forming apparatus 1 typically includes a sheet tray 10, a conveyor 20, a pre-coating device 30, an image forming device 40, a drier 50, a reading device 60, and an output tray 70.

A main conveyance path R1 and a reverse conveyance path R2, which may be collectively referred to as conveyance paths R1 and R2 in the following description, are formed inside the image forming apparatus 1.

The main conveyance path R1 and the reverse conveyance path R2 are spaces through which a medium M can pass inside the image forming apparatus 1.

The main conveyance path R1 is a path that extends from the sheet tray 10 to the output tray 70 via the pre-coating device 30, the image forming device 40, and the drier 50.

The reverse conveyance path R2 branches from the main conveyance path R1 at a branch point B between the drier 50 and the output tray 70 and merges with the main conveyance path R1 at a junction C between the pre-coating device 30 and the image forming device 40.

The conveyor 20 conveys a medium M along the conveyance paths R1 and R2.

More specifically, the conveyor 20 conveys the medium M along the main conveyance path R1 in a direction, which is a conveyance direction, from the sheet tray 10 toward the output tray 70.

The conveyor 20 conveys the medium M along the reverse conveyance path R2 in a direction, i.e., the conveyance direction, from the branch point B to the junction C.

The conveyor 20 includes, for example, multiple conveyance roller pairs 21, a drum-type conveyor 22, and a conveyance belt 23.

The multiple conveyance roller pairs 21 are arranged on the conveyance paths R1 and R2 at predetermined intervals in the conveyance direction.

Each of the conveyance roller pairs 21 typically includes a driving roller and a driven roller that are disposed to face each other across the conveyance paths R1 and R2.

The driving roller is rotated by a driving force transmitted from a motor.

The driven roller contacts the driving roller and rotates together with the rotation of the driving roller.

The driving roller and the driven roller rotate while the driving roller and the driven roller sandwich a medium M to convey the medium M in the conveyance direction.

The drum-type conveyor 22 is disposed to face the image forming device 40.

The drum-type conveyor 22 typically includes a drum 24, an entrance rotator 25, and an exit rotator 26.

The entrance rotator 25 delivers a medium M conveyed from upstream in the conveyance direction to the drum 24.

The drum 24 rotates, while attracting the medium M onto the circumferential surface of the drum 24, to convey the medium M.

The exit rotator 26 transfers the medium M received from the drum 24 to the conveyance belt 23 downstream in the conveyance direction.

The conveyance belt 23 is disposed downstream from the drum-type conveyor 22 in the conveyance direction and upstream from the branch point B in the conveyance direction along the main conveyance path R1.

The conveyance belt 23 rotates, while supporting the medium M on an upper surface of the conveyance belt 23, to convey the medium M in the conveyance direction along the main conveyance path R1.

Of both sides of the medium M, a side opposite to a side on which an image has been formed immediately before by the image forming device 40, contacts the upper surface of the conveyance belt 23.

The pre-coating device 30 is disposed downstream from the sheet tray 10 in the conveyance direction and upstream from the image forming device 40 in the conveyance direction.

The pre-coating device 30 applies pre-coating liquid to fix ink to the medium M to which the ink is unlikely to be fixed.

The image forming device 40 is disposed downstream from the junction C in the conveyance direction and upstream from the drier 50 in the conveyance direction.

The image forming device 40 is disposed to face the main conveyance path R1 around the drum 24.

The image forming device 40 as an image former discharges ink toward the medium M which is conveyed while being attracted by the drum 24 to form an image on the medium M.

The image forming device 40 includes discharge heads 40C, 40M, 40Y, 40B, 40LC, and 40LM that discharge ink of respective colors, such as cyan, magenta, yellow, black, light cyan, and light magenta.

When the discharge heads 40C, 40M, 40Y, 40B, 40LC, and 40LM discharge ink at predetermined timings, an image is formed on the medium M attracted to the drum 24.

Note that the combination of colors of ink discharged by the image forming device 40 is not limited to the above-described example.

In addition, the image forming device 40 that employs an inkjet system is described as an example in embodiments of the present disclosure. However, in some embodiments, the image forming device 40 may employ an electrophotographic system to form an image.

The drier 50 is disposed downstream from the image forming device 40 in the conveyance direction and upstream from the branch point B in the conveyance direction.

The drier 50 is disposed to face the upper surface of the conveyance belt 23.

The drier 50 dries ink that has been attached to the medium M conveyed by the conveyance belt 23.

The drier 50 is, for example, a heater that heats the medium M on the conveyance belt 23, or a blower that blows warm air toward the medium M on the conveyance belt 23.

The reading device 60 is disposed downstream from the drier 50 in the conveyance direction.

The reading device 60 is disposed to face the reverse conveyance path R2.

The reading device 60 reads an image formed on the front side of the medium M on the reverse conveyance path R2 and generates read data.

The read data is image data that represents an image read by the reading device 60.

The reading device 60 is a line sensor in which multiple reading elements are arranged in a main scanning direction orthogonal to the conveyance direction.

As the reading elements of the reading device 60, for example, a charge coupled device (CCD) sensor or a complementary metal oxide semiconductor (CMOS) can be employed.

The conveyor 20 conveys a medium M stored in the sheet tray 10 in the conveyance direction along the main conveyance path R1.

The pre-coating device 30 applies the pre-coating liquid to the front side of a medium M conveyed along the main conveyance path R1. Then, the image forming device 40 forms an image on the medium M, and the drier 50 dries the ink on the medium M.

Next, the conveyor 20 guides the medium M on the front side of which an image has been formed from the main conveyance path R1 to the reverse conveyance path R2 at the branch point B. Then, the conveyor 20 conveys the medium M in the conveyance direction along the reverse conveyance path R2 and guides the medium M from the reverse conveyance path R2 to the main conveyance path R1 at the junction C.

Thus, the medium M that has been reversed is supplied to the main conveyance path R1 again.

Next, the conveyor 20 conveys the medium M that has been reversed in the conveyance direction along the main conveyance path R1.

The image forming device 40 forms an image on the back side of the medium M conveyed along the main conveyance path R1, and the drier 50 dries ink that has been attached onto the back side of the medium M.

Subsequently, the conveyor 20 ejects the medium M on which the images have been formed on the front side and the back side of the medium M to the output tray 70.

Figure 2:
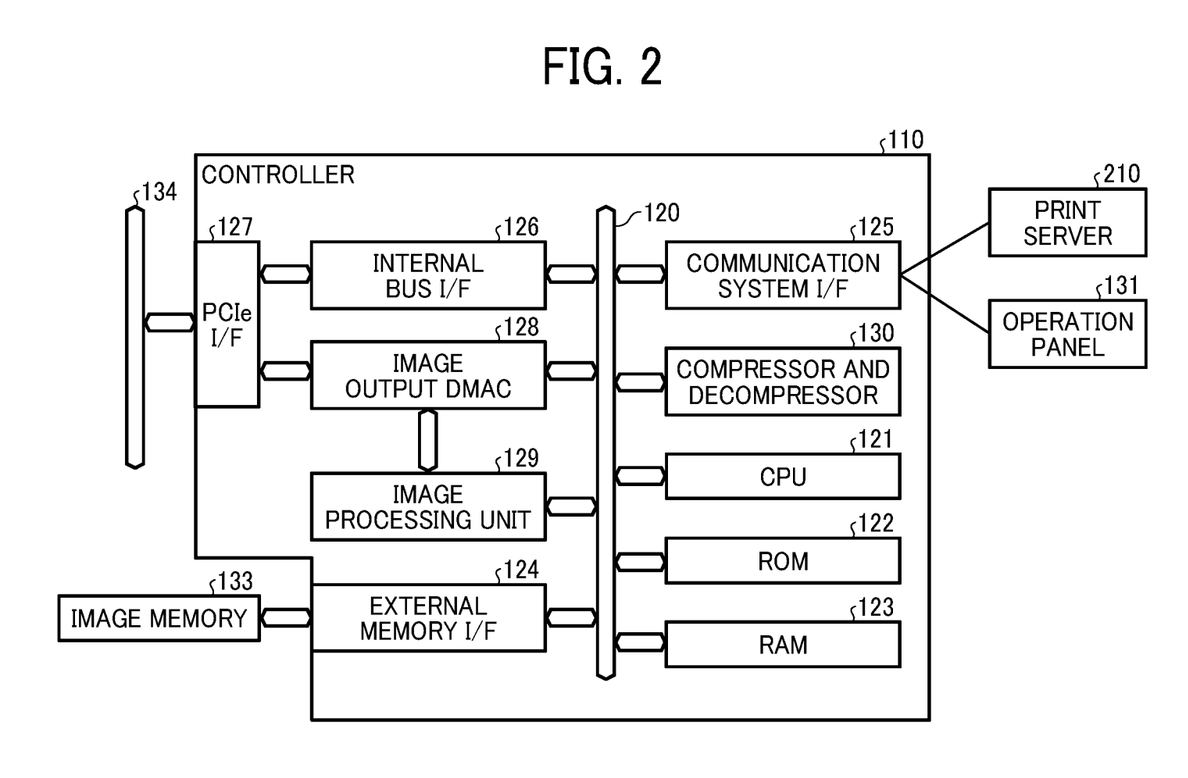
FIG. 2 is a block diagram illustrating a configuration of the image forming apparatus of FIG. 1.

FIG. 2 is a block diagram illustrating a configuration of the image forming apparatus 1, according to the present embodiment.

The image forming apparatus 1 includes a controller 110.

The controller 110 controls an overall operation of the image forming apparatus 1.

As illustrated in FIG. 2, the controller 110 includes a central processing unit (CPU) 121, a read only memory (ROM) 122, a random access memory (RAM) 123, an external memory interface (I/F) 124, a communication system I/F 125, an internal bus I/F 126, a peripheral component interconnect express (PCIe) I/F 127, an image output direct memory access controller (DMAC) 128, an image processing unit 129, and a compressor and decompressor 130.

An internal bus 120 connects the above-described units and components.

The internal bus 120 further connects the above-described units and components to a PCIe bus 134 via the internal bus I/F 126 and the PCIe I/F 127.

The CPU 121 executes various types of arithmetic processing to perform all settings related to the operation of the image forming apparatus 1 and activates the image output DMAC 128, the image processing unit 129, and the compressor and decompressor 130.

An operation control program that is employed, for example, for the CPU 121 is stored in the ROM 122.

The RAM 123 is employed not only as a temporary storage location in which calculation results of the CPU 121 and various kinds of data are stored but also as a memory to store images.

The ROM 122 and the RAM 123 are collectively referred to as internal memories unless the ROM 122 and the RAM 123 are distinguished from each other.

An image memory 133 is also employed as a memory to store images.

The image memory 133 is connected to the CPU 121 via the external memory I/F 124.

When the CPU 121 receives image data from a print server 210, the CPU 121 draws an image in the image memory 133 via the external memory I/F 124 based on a printer language.

The communication system I/F 125 is an I/F that connects the print server 210 and an operation panel 131 to the CPU 121.

The internal bus I/F 126 is an I/F that connects the PCIe I/F 127 to the internal bus 120.

The internal bus I/F 126 inputs and outputs image data between address buses designated by a PCIe bus master and the image memory 133 via the external memory I/F 124.

The PCIe I/F 127 performs data transmission and reception with the PCIe bus master in accordance with a protocol of the PCIe bus 134.

The image output DMAC 128 and the image processing unit 129 are connected to, for example, the CPU 121 and the external memory I/F 124 via the internal bus 120.

The image output DMAC 128 is also connected to the PCIe I/F 127.

The image output DMAC 128 functions as a DMA controller when printing is performed.

In other words, when the image output DMAC 128 is activated by the CPU 121, the image output DMAC 128 reads image data from an external memory in a pre-designated area and outputs the image data to the PCIe I/F 127.

The above-described output is performed by an exchange of handshake at any time.

The image processing unit 129 corrects distortion of an image that has been read.

The compressor and decompressor 130 is employed to save memory and is activated by the CPU 121 to compress or decompress various types of data.

Figure 3:
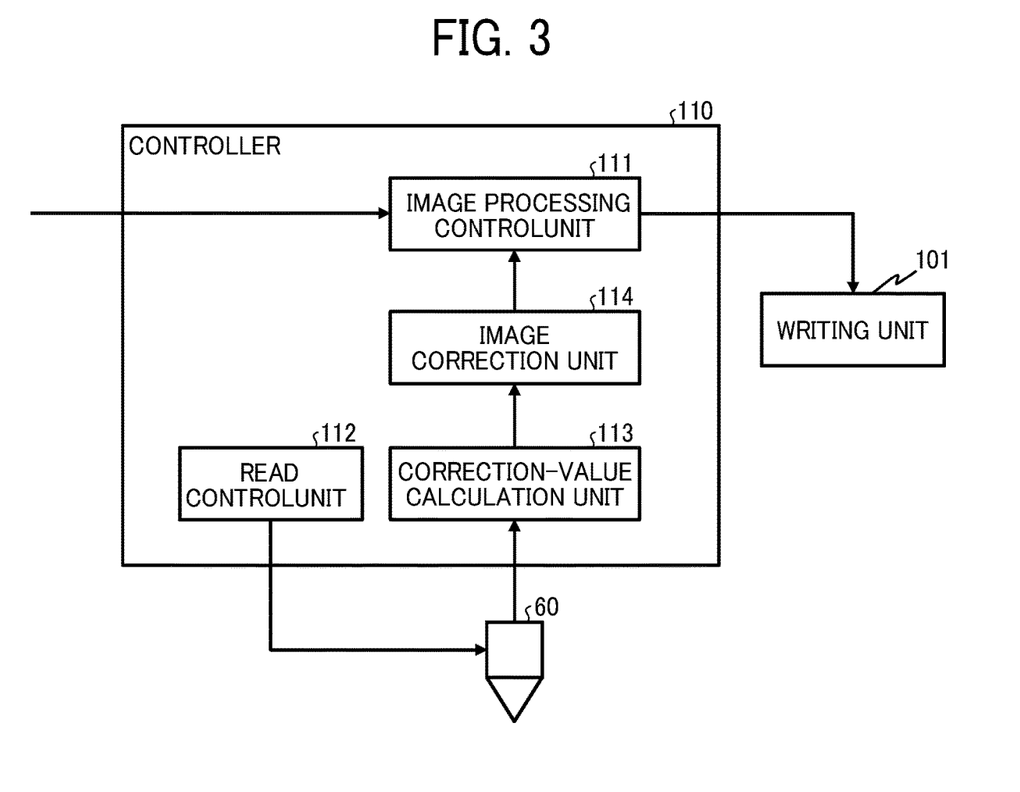
FIG. 3 is a functional block diagram of a controller of FIG. 2.

FIG. 3 is a functional block diagram of the controller 110 according to the present embodiment.

As illustrated in FIG. 3, the controller 110 includes an image processing control unit 111, a reading control unit 112, a correction-value calculation unit 113, and an image correction unit 114.

The CPU 121 loads programs stored in the ROM 122 into the RAM 123 and executes the programs to implement each of the above-described functions.

The image processing control unit 111 converts image data into a format in which a writing unit 101 can form an image.

The reading control unit 112 causes the reading device 60 to read an image formed on a medium M at a predetermined timing and transmits read data generated by the reading device 60 to the correction-value calculation unit 113.

The correction-value calculation unit 113 analyzes read data transmitted from the reading control unit 112 to calculate a correction value and transmits the calculated correction value to the image correction unit 114.

The image correction unit 114 uses the correction value transmitted from the correction-value calculation unit 113 to correct the image data and transmits the corrected image data to the image processing control unit 111.

Figure 4:
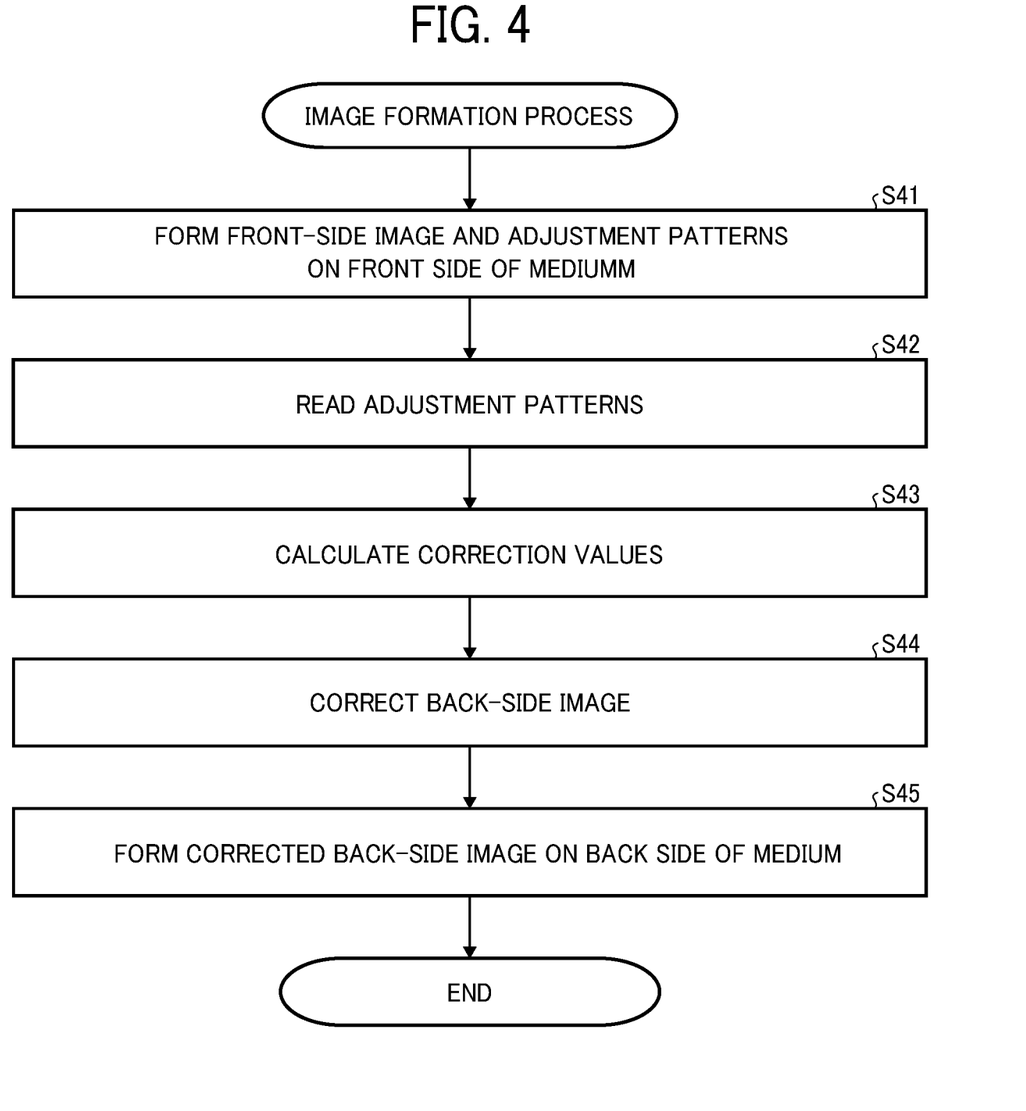
FIG. 4 is a flowchart of an image forming process according to an embodiment of the present disclosure.

FIG. 4 is a flowchart of an image forming process according to the present embodiment.

Figure 5A:
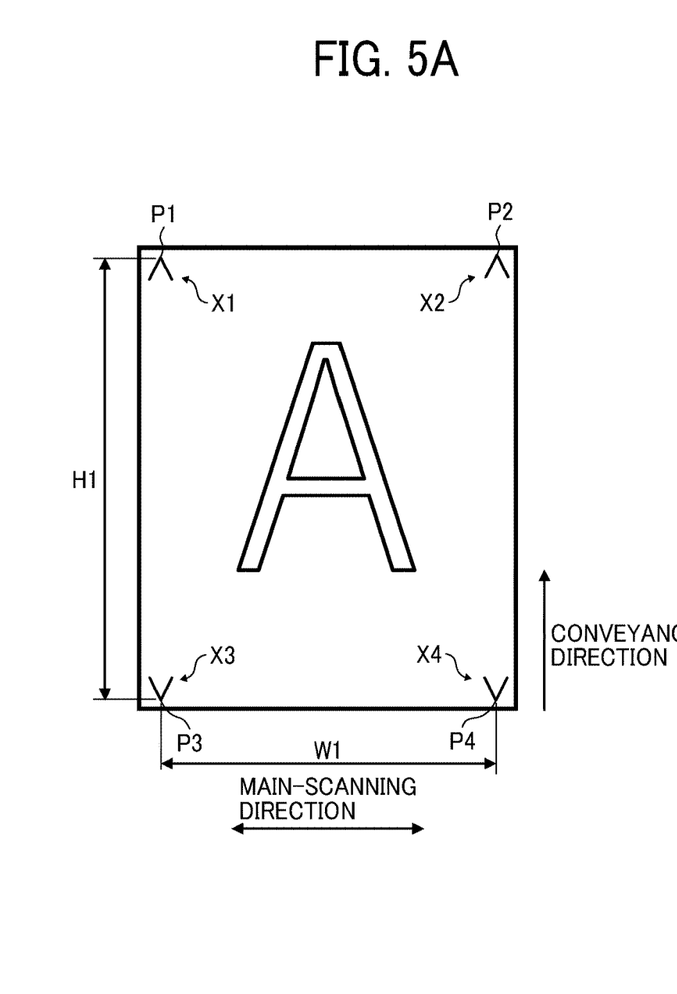
FIGS. 5A and 5B are diagrams each illustrating a front-side image and adjustment patterns that are formed on the front side of a medium, according to an embodiment of the present disclosure.
Figure 5B:
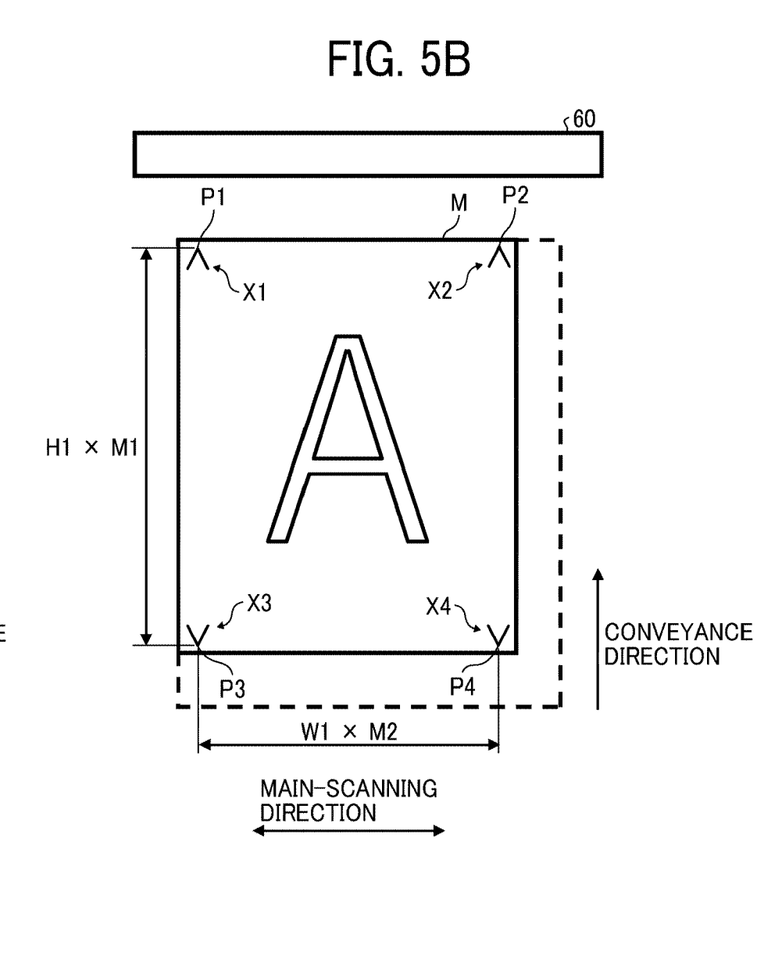

FIGS. 5A and 5B are diagrams each illustrating a front-side image and adjustment patterns that are formed on the front side of a medium M, according to the present embodiment.

Figure 6A:
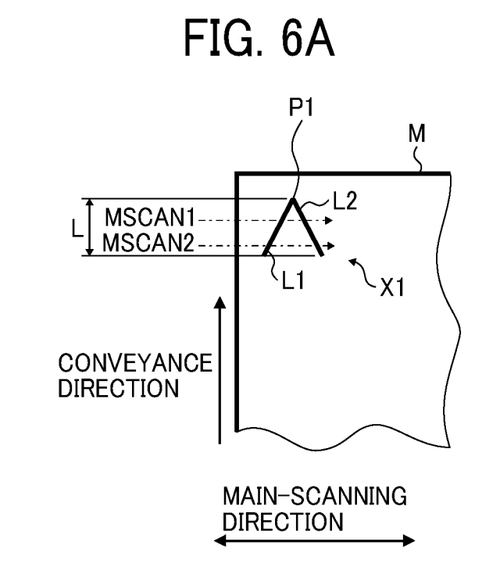
FIGS. 6A, 6B, and 6C are diagrams illustrating a procedure to specify intersections of adjustment patterns, according to an embodiment of the present disclosure.
Figure 6B:
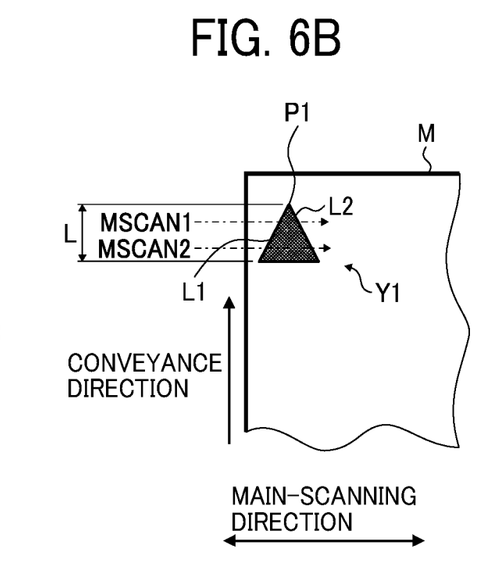
Figure 6C:
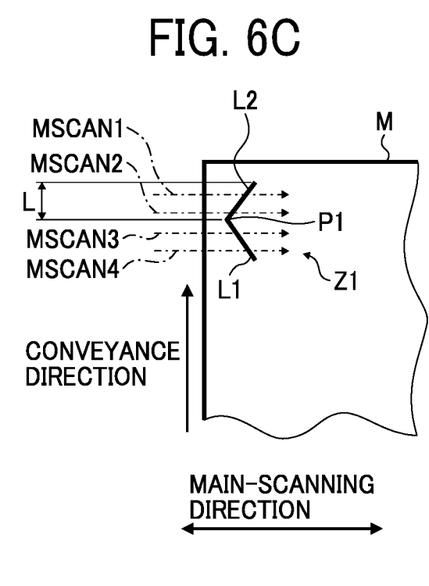

FIGS. 6A, 6B, and 6C are diagrams illustrating a procedure to specify intersections of adjustment patterns, according to the present embodiment.

Figure 7A:
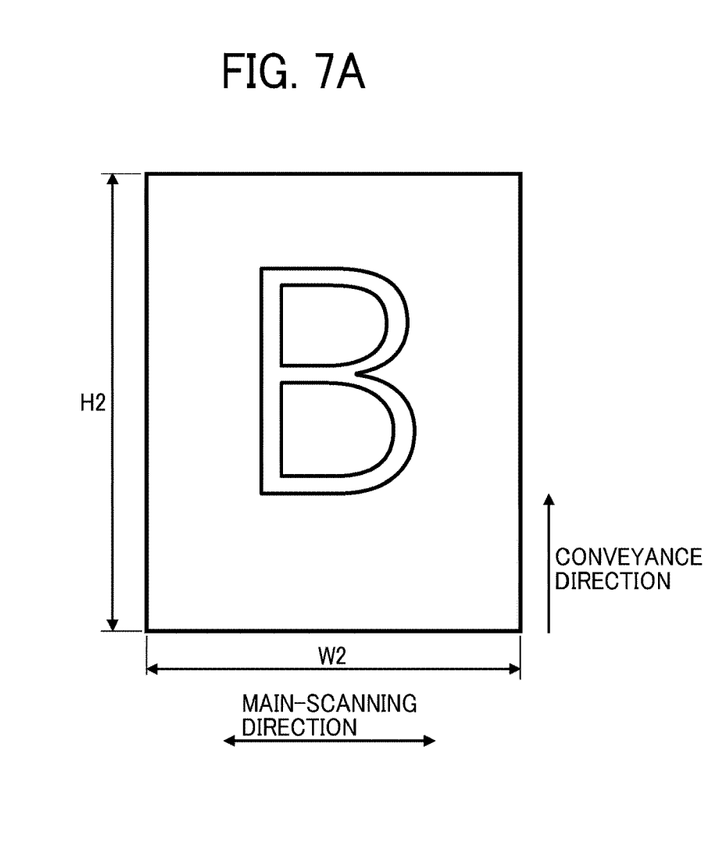
FIGS. 7A and 7B are diagrams each illustrating a back-side image formed on the back side of a medium, according to an embodiment of the present disclosure.
Figure 7B:
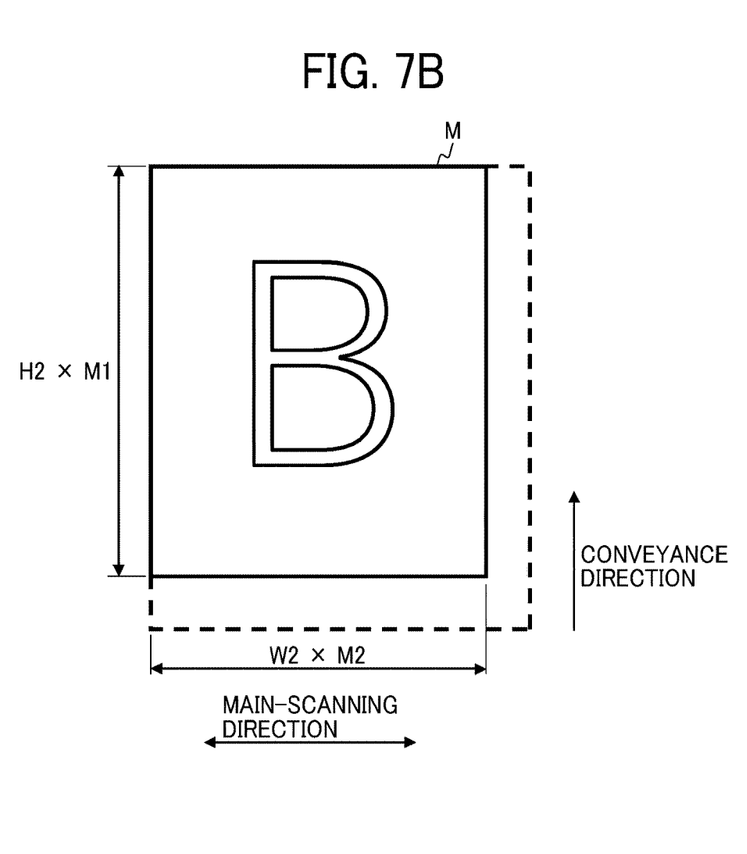

FIGS. 7A and 7B are diagrams each illustrating a back-side image formed on the back side of the medium M, according to the present embodiment.

The controller 110 executes the image forming process illustrated in FIG. 4, for example, in response to acquisition of an image formation instruction from the print server 210.

The image formation instruction includes front-side image data that represents a front-side image as a first-face image, and back-side image data that represents a back-side image as a second-face image.

However, a source from which the controller 110 acquires the image formation instruction is not limited to the print server 210.

First, the image processing control unit 111 converts a front-side image represented by front-side image data acquired from the print server 210 and predetermined adjustment patterns into a format in which the writing unit 101 can form an image. Then, the image processing control unit 111 causes the writing unit 101 to form an image on the front side of the medium M (step S41).

In other words, the writing unit 101 causes the discharge heads 40C, 40M, 40Y, 40B, 40LC, and 40LM to discharge ink at predetermined timings onto the front side of the medium M conveyed by the conveyor 20 to a position facing the image forming device 40.

FIG. 5A indicates ideal positions at which a front-side image A and adjustment patterns X1, X2, X3, and X4 are to be formed on the front side of the medium M.

The front-side image A is formed at a position instructed by the print server 210 on the front side of the medium M.

Each of the adjustment patterns X1, X2, X3, and X4 is formed at a predetermined position on an outer periphery of the front side of the medium M.

In addition, the adjustment patterns X1, X2, X3, and X4 are formed in a region, which is a margin of the front side of the medium M, outside a region in which the front-side image A can be formed on the front side of the medium M.

Each of the adjustment patterns X1, X2, X3, and X4 according to the present embodiment is formed at corresponding one of four corners of the front side of the medium M.

Next, the conveyor 20 conveys the medium M on which the front-side image A and the adjustment patterns X1, X2, X3, and X4 have been formed in the main scanning direction along the main conveyance path R1. Then, the conveyor 20 causes the medium M to enter the reverse conveyance path R2 at the branch point B and conveys the medium M in the main scanning direction along the reverse conveyance path R2.

The drier 50 dries ink that has been attached to the medium M conveyed on the main conveyance path R1 by the conveyor 20.

FIG. 5B illustrates the medium M in a state in which the medium M has been dried by the drier 50.

As illustrated in FIG. 5B, the medium M that has been dried, which is illustrated in solid line, is shrunk and smaller in size than the medium M that has not been dried, which is illustrated in broken lines.

Accordingly, the positions of the front-side image A and the adjustment patterns X1, X2, X3, and X4 on the medium M that has been dried shift from the ideal positions illustrated in FIG. 5A. The sizes of the front-side image A and the adjustment patterns X1, X2, X3, and X4 also change and decrease.

Next, the reading control unit 112 causes the reading device 60 to read the adjustment patterns X1, X2, X3, and X4 formed on the front side of the medium M that has been dried (step S42).

As illustrated in FIG. 5B, the length of the reading device 60, which is a line sensor, that extends in the main scanning direction is set to be longer than a maximum length of the medium M in the main scanning direction.

The reading device 60 reads the adjustment patterns X1, X2, X3, and X4 on the medium M while the medium M is conveyed by the conveyor 20, in other words, while the medium M is not stopped.

As illustrated in FIG. 6A, the adjustment pattern X1 according to the present embodiment includes a first line segment L1 and a second line segment L2.

The first line segment L1 and the second line segment L2 are inclined with respect to the conveyance direction.

Further, the first line segment L1 and the second line segment L2 linearly extend in different directions.

More specifically, the first line segment L1 and the second line segment L2 are inclined in opposite directions with respect to the conveyance direction.

Downstream ends of the first line segment L1 and the second line segment L2 in the conveyance direction intersect with each other.

In other words, an intersection P1 of the adjustment pattern X1 formed at a left corner in a leading end portion of the medium M faces the outside of the medium M.

Each of the adjustment patterns X2, X3, and X4 has a shape similar to the shape of the adjustment pattern X1 as described above.

The adjustment patterns X1 and X2 are arranged at positions separated from each other in the main scanning direction on the medium M and are oriented in the same direction at the same position in the conveyance direction.

On the other hand, the adjustment patterns X3 and X4 formed at a left rear corner and a right rear corner, respectively, of the medium M have shapes obtained by inverting the adjustment patterns X1 and X2 in the conveyance direction.

Further, the adjustment patterns X3 and X4 are disposed upstream from the adjustment patterns X1 and X2 in the conveyance direction.

In addition, the adjustment patterns X3 and X4 are disposed at positions separated from each other in the main scanning direction on the medium M and are oriented in the same direction at the same position in the conveyance direction.

The reading control unit 112 causes the reading device 60 to read the front side of the medium M at a first position, which is illustrated as MSCAN1, and a second position, which is illustrated as MSCAN2 in FIGS. 6A, 6B, and 6C, of the medium M.

Thus, two pieces of read data that each represent an image of one line extending in the main scanning direction are generated.

The first position and the second position are both positions at which the adjustment patterns X1 and X2 are formed.

The first position and the second position are positions separated from each other in the conveyance direction.

In other words, an image that is indicated by the read data includes different portions of the first line segment L1 and the second line segment L2 of each of the adjustment patterns X1 and X2.

Then, the reading control unit 112 transmits the two pieces of read data generated by the reading device 60 to the correction-value calculation unit 113.

Similarly, the reading control unit 112 causes the reading device 60 to read the front side of the medium M at the two positions at which the adjustment patterns X3 and X4 are formed.

A media sensor may be disposed on the reverse conveyance path R2.

Such a media sensor detects that the medium M has passed through a predetermined position upstream from the reading device 60 in the conveyance direction.

Then, the reading control unit 112 determines that the first position of the medium M faces the reading device 60 at a timing when a predetermined time has elapsed after the media sensor detects the leading end of the medium M, and causes the reading device 60 to read the medium M.

In addition, the reading control unit 112 determines that the second position of the medium M faces the reading device 60 at a timing when a predetermined time has elapsed after the reading device 60 faces the first position, and causes the reading device 60 to read the medium M.

As another example, the reading device 60 may control a timing at which the reading device 60 reads the medium M based on a pulse signal output from a rotary encoder of a motor that drives the conveyance roller pairs 21, instead of the time that elapses after the media sensor detects the leading end of the medium M.

Next, the correction-value calculation unit 113 calculates correction values based on the read data acquired in step S42 (step S43).

First, the correction-value calculation unit 113 specifies positions of the first line segment L1 and the second line segment L2 on the medium M based on read data acquired at the first position and the second position.

In addition, the correction-value calculation unit 113 specifies inclinations of the first line segment L1 and the second line segment L2 that connect the two positions that have been specified.

Furthermore, the correction-value calculation unit 113 specifies an actual position of the intersection P1 at which the first line segment L1 and the second line segment L2 intersect each other on the medium M based on the specified positions and inclinations of the first line segment L1 and the second line segment L2.

Similarly, the correction-value calculation unit 113 specifies actual positions of the intersections P2, P3, and P4 of the adjustment patterns X2, X3, and X4, respectively, on the medium M.

Next, the correction-value calculation unit 113 calculates correction values to correct a back-side image of the medium M based on the ideal positions of the intersections P1, P2, P3, and P4 of the adjustment patterns X1, X2, X3, and X4, respectively, illustrated in FIG. 5A and the actual positions of the intersections P1, P2, P3, and P4 of the adjustment patterns X1, X2, X3, and X4, respectively, illustrated in FIG. 5B.

Specific examples of the correction values are not particularly limited. However, the correction values may be, for example, correction values M1 and M2 described below.

The correction-value calculation unit 113 calculates a ratio of an actual distance between the intersection P1 and the intersection P3 illustrated in FIG. 5B with respect to an ideal distance H1 between the intersection P1 and the intersection P3 illustrated in FIG. 5A as a correction value M1 (%) in the conveyance direction.

Further, the correction-value calculation unit 113 calculates a ratio of an actual distance between the intersection P1 and the intersection P2 illustrated in FIG. 5B with respect to an ideal distance W1 between the intersection P1 and the intersection P2 illustrated in FIG. 5A as a correction value M2 (%) in the main scanning direction.

Then, the correction-value calculation unit 113 transmits the calculated correction values M1 and M2 to the image correction unit 114.

Next, the image correction unit 114 corrects a back-side image, which is represented by back-side image data acquired from the print server 210, based on the correction values M1 and M2 calculated in step S43 (step S44).

The image correction unit 114 reduces sizes H2 and W2 of the back-side image of the medium M before the back-side image is corrected as illustrated in FIG. 7A by the correction value M1 (%) in the conveyance direction and by the correction value M2 (%), respectively, in the main scanning direction.

In addition, the image correction unit 114 moves the position of the back-side image of the medium M that has not been corrected yet by the correction value M1 (%) downstream in the conveyance direction and by the correction value M2 (%) toward the adjustment patterns X1 and X3 in the main scanning direction, which is the left side in the example illustrated in FIG. 7A.

Then, the image correction unit 114 transmits the back-side image data that represents the corrected back-side image to the image processing control unit 111.

Next, the image processing control unit 111 converts the back-side image that has been corrected in step S44 into a format in which the writing unit 101 can form an image to form a back-side image on the back side of the medium M (step S45).

In other words, the writing unit 101 causes the discharge heads 40C, 40M, 40Y, 40B, 40LC, and 40LM to discharge ink at a predetermined timing onto the back side of the medium M that has been conveyed by the conveyor 20 to a position facing the image forming device 40.

According to the above-described embodiments, for example, the following operational effects can be achieved.

According to the above-described embodiments, the adjustment patterns X1, X2, X3, and X4 are formed with the first line segments L1 and the second line segment L2 that are inclined with respect to the conveyance direction. Accordingly, the adjustment patterns X1, X2, X3, and X4 can be properly read even while the medium M is conveyed regardless of the reading resolutions of the reading device 60.

As a result, even when the conveyance speed of the medium M is increased, the position shifts of the front-side image and the back-side image of the medium M can be properly corrected.

Accordingly, enhancement in both the productivity and the image formation quality of the image forming apparatus 1 can be achieved.

In addition, the image forming apparatus 1 does not need to include a reading device that has a high reading resolution. Accordingly, the cost of the image forming apparatus 1 can be reduced.

Note that the specific shapes of the adjustment patterns X1, X2, X3, and X4 are not limited to the example illustrated in FIG. 6A.

As an example, a portion between the first line segment L1 and the second line segment L2 may be filled with ink to have a triangular outer shape as in a case of an adjustment pattern Y1 illustrated in FIG. 6B.

As another example, as in a case of an adjustment pattern Z1 illustrated in FIG. 6C, the first line segment L1 and the second line segment L2 may be inclined in opposite directions with respect to the main scanning direction.

Note that in the case of the adjustment pattern Z1 of FIG. 6C, the reading control unit 112 may read the first line segment L1 at the first position, i.e., MSCAN1 and the second position, i.e., MSCAN2 separated from each other in the conveyance direction and may read the second line segment L2 at a third position, i.e., MSCAN3 and a fourth position, i.e., MSCAN4 separated from each other in the conveyance direction.

As still another example, the first line segment L1 and the second line segment L2 may not intersect with each other.

In this case, the correction-value calculation unit 113 may specify the position of an intersection of extension lines of the first line segment L1 and the second line segment L2.

Further, the control method described above may be achieved by, for example, a program.

That is, the control method may be executed by a computer that causes an arithmetic device, a storage device, an input device, an output device, and a control device to operate in cooperation with each other based on a program.

Further, the program may be written and distributed in a storage device, a storage medium, or may be distributed through an electric communication line.

Embodiments of the present disclosure are not limited to the above-described embodiments, and various modifications can be made without departing from the technical scope of the present disclosure.

It is therefore to be understood that the disclosure of the present specification may be practiced otherwise by those skilled in the art than as specifically described herein.

Such embodiments and modifications of the present disclosure are included in the scope and gist of the embodiments of the present disclosure and are included in the embodiments described in claims and the equivalent scope of the present disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
a conveyor to convey a medium in a conveyance direction;
an image former to form an adjustment pattern on one side of the medium conveyed by the conveyor;
a reading device downstream from the image former in the conveyance direction, to read the adjustment pattern on the one side of the medium conveyed by the conveyor to generate read data, the adjustment pattern including a first line segment and a second line segment that extend in directions different from each other and each are inclined with respect to the conveyance direction; and
processing circuitry to analyze the read data generated by the reading device,
wherein the reading device is a line sensor including a plurality of reading elements arranged in a main scanning direction orthogonal to the conveyance direction,
wherein the processing circuitry is to:
cause the reading device to read the adjustment pattern at a plurality of positions separated in the conveyance direction on the medium;
specify an actual position of an intersection of the first line segment and the second line segment based on a plurality of pieces of read data generated by the reading device;
correct an other-side image to be formed on the other side opposite to the one side of the medium based on an ideal position and the actual position of the intersection of the first line segment and the second line segment; and
cause the image former to form a one-side image and the adjustment pattern on the one side of the medium and form the other-side image corrected by the processing circuitry on the other side of the medium.

2. The image forming apparatus according to claim 1, wherein the first line segment and the second line segment are inclined in opposite directions with respect to the conveyance direction.

3. The image forming apparatus according to claim 1, wherein the first line segment and the second line segment are inclined in opposite directions with respect to the main scanning direction.

4. The image forming apparatus according to claim 1, wherein the adjustment pattern includes a region filled with ink between the first line segment and the second line segment.

* * * * *